L. E. BOGEN.
SYSTEM OF SPEED REGULATION.
APPLICATION FILED APR. 19, 1909.
1,113,094. Patented Oct. 6, 1914.
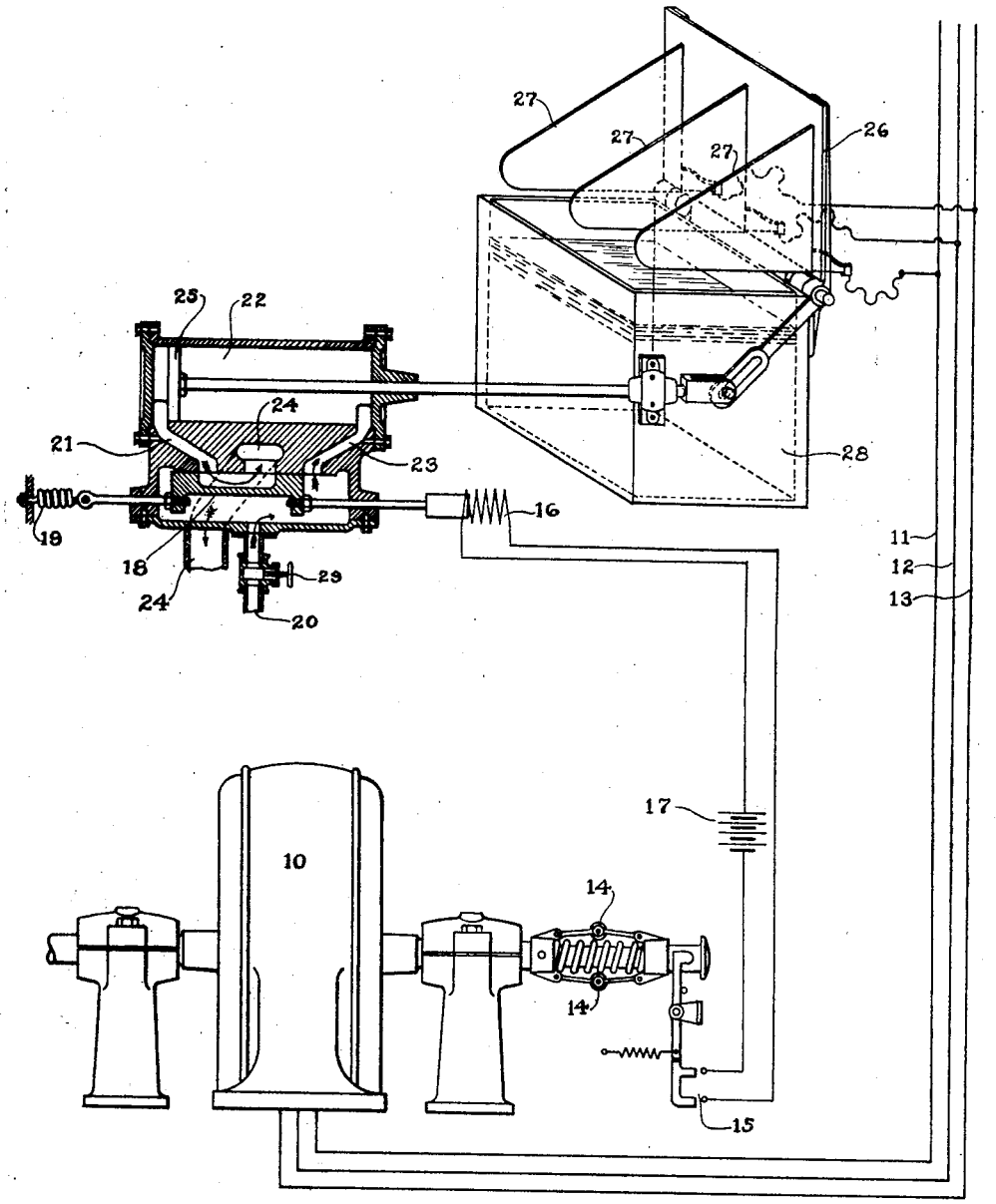
Witnesses
John L. Johnson.
Chas. L. Byron
Inventor
Louis E. Bogen
By Chas. E. Lord
Attorney

UNITED STATES PATENT OFFICE.

LOUIS E. BOGEN, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

SYSTEM OF SPEED REGULATION.

1,113,094.   Specification of Letters Patent.   Patented Oct. 6, 1914.

Application filed April 19, 1909. Serial No. 490,981.

*To all whom it may concern:*

Be it known that I, LOUIS E. BOGEN, a citizen of the United States, residing at Milwaukee, in the county of Milwaukee and State of Wisconsin, have invented certain new and useful Improvements in Systems of Speed Regulation, of which the following is a full, clear, and exact specification.

My invention relates to devices for preventing dynamo-electric machines from attaining undue speed.

It sometimes happens that dynamo-electric machines, especially generators driven by water power, tend greatly to increase in speed, the usual speed limiting devices being inadequate to prevent such increase. In some such cases the generators have been destroyed, and the buildings in which they are located have been wrecked, with great danger to life and limb.

My invention is intended for just such cases, and operates when the usual speed limiting devices fail of their purpose. It may also be used where there are no other speed limiting devices. In either case it operates effectually.

In carrying out my invention there is provided means for automatically applying an electrical load to a dynamo-electric machine when such machine increases in speed beyond a predetermined limit. In the embodiment of my invention which is illustrated, a resistance is automatically connected across the line supplied by a generator whenever such generator exceeds a predetermined speed, and such resistance is gradually decreased as long as the generator continues to rotate at more than such predetermined speed.

The various novel features of my invention are apparent from the following description and the accompanying drawing, and will be particularly pointed out in the claims.

The single figure of the drawing shows diagrammatically one embodiment of my invention.

A dynamo-electric machine 10, which is to be protected from undue speed, is here indicated as a three-phase generator supplying a circuit 11—12—13. The machine to be protected, however, may be any other kind of dynamo-electric machine. When the speed of this machine exceeds the predetermined limit, a fly-ball governor or other speed-responsive device 14 causes the closing of the switch 15 to complete the circuit of the solenoid 16. This circuit may be energized from any desired source, such as a battery 17. The solenoid 16, when energized, moves the D-valve 18 to the right against the action of the spring 19 and thus connects a supply pipe 20 from any convenient source of fluid supply to the left hand opening 21 of the cylinder 22, and also connects the right hand opening 23 of said cylinder to the exhaust 24. The fluid pressure at the left of the piston 25 causes said piston to move to the right to tilt the cover 26 of a water rheostat 28 and dip the rheostat plates 27, which are connected respectively to the mains 11, 12, and 13, gradually more and more into the water of the rheostat. This puts a gradually increasing electrical load on the generator 10, and tends to slow the latter down. The rate at which the plates 27 dip into the water of the rheostat and the load on the generator increases can be regulated by a valve 29 in the supply pipe 20.

When the plates 27 have dipped far enough into the liquid of the rheostat to increase the load on the generator 10 sufficiently to cause the latter to slow down below the predetermined maximum speed, the speed-responsive governor 14 allows the switch 15 to open to deënergize the solenoid 16. The spring 19 then moves the D-valve 18 back to the position in which it is shown in the drawings, and fluid pressure is admitted from the pipe 20 through the opening 23 to the right hand end of the cylinder 22, while the left hand end of such cylinder is connected to the exhaust 24. This causes the piston 25 to be removed to the left and the plates 27 to be gradually lifted out of the liquid of the rheostat, gradually decreasing the load on the generator 10. This operation is repeated as often as the speed of the machine 10 rises above the limit for which the speed-responsive governor 14 and switch 15 are set, and operates invariably to prevent the speed of the machine 10 from exceeding such predetermined limit to any extent.

Many modifications may be made in the precise arrangement shown and described. For instance, other forms of rheostats may be substituted for the water rheostat, although I now consider the water rheostat to be the most satisfactory. The rheostat, of whatever form, may be otherwise operated than by fluid pressure. Indeed, in some cases it suffices to connect a resistance of constant value across the line upon undue increase of speed in its machine to be protected. All such modifications which may be made within the spirit and scope of my invention I aim to cover in the following claims.

What I claim as new is:

1. In combination, a generator, a load circuit supplied thereby, a variable resistance, and automatic means for connecting said resistance across said load circuit when, and gradually decreasing its resistance value while, the speed of the generator exceeds only a predetermined abnormally high value, said resistance acting directly as an artificial load on the generator to decrease its speed.

2. In combination, a generator, a load circuit supplied thereby, a variable resistance, and means controlled by the speed of the generator for connecting said resistance across said load circuit when, and gradually decreasing the value of such resistance while, the speed of the generator exceeds only a predetermined abnormally high value, and for gradually increasing the value of said resistance and disconnecting the resistance from the circuit upon a fall in the speed of the generator below such predetermined value, the insertion of said resistance acting directly to decrease the generator speed.

3. In combination, a generator, automatic means responsive to the speed of said generator for gradually increasing the electrical load on such generator when the speed of the generator rises above a predetermined abnormally high value, the increase in said electrical load acting directly to decrease the speed of said generator, and means for adjusting the rate at which such load is increased.

4. In combination, a generator, and means responsive to the speed of said generator for automatically and gradually increasing the electrical load on the generator while the speed of said generator exceeds only a predetermined abnormally high value and for automatically and gradually decreasing the electrical load on said generator upon a fall in speed of the generator below such predetermined value, said changes in the load on said machine directly affecting the speed of said generator.

5. In combination, a generator, means for automatically and gradually increasing the electrical load on the generator when the speed of the generator exceeds a predetermined abnormally high value and for automatically and gradually decreasing the electrical load on said generator upon a fall in speed of said generator below such predetermined value, changes in said load acting directly to change the speed of said generator, and means for adjusting the rate at which such load is increased or decreased.

Milwaukee, Wis., Apr. 16, 1909.

In testimony whereof I affix my signature, in the presence of two witnesses.

LOUIS E. BOGEN.

Witnesses:
H. C. CASE,
CHAS. L. BYRON.

---

Copies of this patent may be obtained for five cents each, by addressing the "Commissioner of Patents, Washington, D. C."